United States Patent
Wen et al.

(10) Patent No.: US 9,541,984 B2
(45) Date of Patent: Jan. 10, 2017

(54) L2 FLUSH AND MEMORY FABRIC TEARDOWN

(71) Applicant: Apple Inc., Cupertino, CA (US)

(72) Inventors: Shih-Chieh R. Wen, San Jose, CA (US); Jason M. Kassoff, Denver, CA (US); Wei-Han Lien, San Jose, CA (US)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 13/910,584

(22) Filed: Jun. 5, 2013

(65) Prior Publication Data

US 2014/0365798 A1     Dec. 11, 2014

(51) Int. Cl.
*G01F 1/32*     (2006.01)
*G06F 1/32*     (2006.01)

(52) U.S. Cl.
CPC ........... *G06F 1/3228* (2013.01); *G06F 1/3206* (2013.01); *G06F 1/3275* (2013.01); *G06F 1/3278* (2013.01)

(58) Field of Classification Search
CPC .... G06F 1/3234; G06F 1/3275; G06F 1/3278; G06F 1/3206; G06F 1/3253; G06F 12/0815
See application file for complete search history.

(56) References Cited

U.S. PATENT DOCUMENTS

| | | | |
|---|---|---|---|
| 8,359,410 B2 | 1/2013 | Conroy et al. | |
| 2009/0259862 A1* | 10/2009 | Bulusu | G06F 1/3237 713/322 |
| 2010/0058078 A1* | 3/2010 | Branover et al. | 713/300 |
| 2010/0169609 A1* | 7/2010 | Finkelstein | G06F 1/3203 712/43 |
| 2010/0287394 A1* | 11/2010 | Branover et al. | 713/323 |
| 2011/0264934 A1* | 10/2011 | Branover et al. | 713/320 |
| 2011/0296222 A1* | 12/2011 | Tan et al. | 713/324 |
| 2012/0102344 A1* | 4/2012 | Kocev et al. | 713/322 |
| 2012/0166837 A1* | 6/2012 | Henry | G06F 1/3206 713/321 |
| 2012/0260116 A1 | 10/2012 | Chen et al. | |
| 2013/0262780 A1* | 10/2013 | Manne et al. | 711/142 |
| 2014/0181554 A1* | 6/2014 | Manne | G06F 1/3234 713/323 |
| 2014/0181556 A1* | 6/2014 | Eckert et al. | 713/323 |

\* cited by examiner

*Primary Examiner* — Aristocratis Fotakis
(74) *Attorney, Agent, or Firm* — Meyertons, Hood, Kivlin, Kowert & Goetzel, P.C.

(57) ABSTRACT

A system and a method which include one or more processors, a memory coupled to at least one of the processors, a communication link coupled to the memory, and a power management unit. The power management unit may be configured to detect an inactive state of at least one of the processors. The power management unit may be configured to disable the communication link at a time after the processor enters the inactive state, and disable the memory at another time after the processor enters the inactive state.

20 Claims, 5 Drawing Sheets

L2 FLUSH AND MEMORY FABRIC TEARDOWN

BACKGROUND

Technical Field

This invention is related to the field of integrated circuit implementation, and more particularly to the implementation of power management circuits.

Description of the Related Art

Computing systems may include one or more systems on a chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

Each functional block included within an SoC may be designed in accordance to one of various design flows. The logical operation of some functional blocks may be described in a high-level computer language such as, e.g., Very-high-speed integrated circuit hardware description language (VHDL). Logic gate implementations of blocks described in such a fashion may be generated using logic synthesis and place-and-route design techniques. Other functional blocks, such as memories, phase-locked loops (PLLs), analog-to-digital converters (ADCs), may be designed in a full-custom fashion.

In some SoC designs, processors included in the SoC may enter an inactive state upon completing certain computing tasks to reduce power consumption or to reduce the emission of electromagnetic interference (EMI). Peripheral circuitry may similarly enter idle states to further conserve system power consumption or reduce EMI. In some designs, clock gating and power gating may be used to place functional blocks, such as e.g., processors, into inactive states. Clock gating entails disabling a clock from a functional logic block in order to reduce the amount of logic being clocked, thereby reducing switching power and reducing the amount of EMI being radiated. In a similar fashion, power gating involves a power source being disconnected from the functional block. Power gating may result in reduced switching power and leakage power. Clock gating may not reduce leakage power, but may reduce switching power of logic circuits within the SoC as well as the clock distribution network and may allow the logical state of the block to be maintained while the block is not being used.

SUMMARY OF THE EMBODIMENTS

Various embodiments of a computing system are disclosed. Broadly speaking, a system and a method are contemplated in which the system includes one or more processors, a memory coupled to at least one of the processors, a communication link coupled to the memory, and a power management unit. The power management unit may be configured to detect an inactive state of at least one of the processors. The power management unit may be configured to disable the communication link at a time after the processor enters the inactive state, and disable the memory at another time after the processor enters the inactive state.

In another embodiment, the power management unit may be further configured to compare an output value of a timer circuit to a pre-determined value, set by an application running on the processor for example, before disabling the communication link.

In a further embodiment, the power management unit may also be configured to compare an output value of a timer circuit to a second pre-determined value. The power management unit may then disable the memory.

In a further non-limiting embodiment, the power management unit may be configured to receive values representing the pre-determined values from an application running on one or more of the processors.

BRIEF DESCRIPTION OF THE DRAWINGS

The following detailed description makes reference to the accompanying drawings, which are now briefly described.

Figure 1:
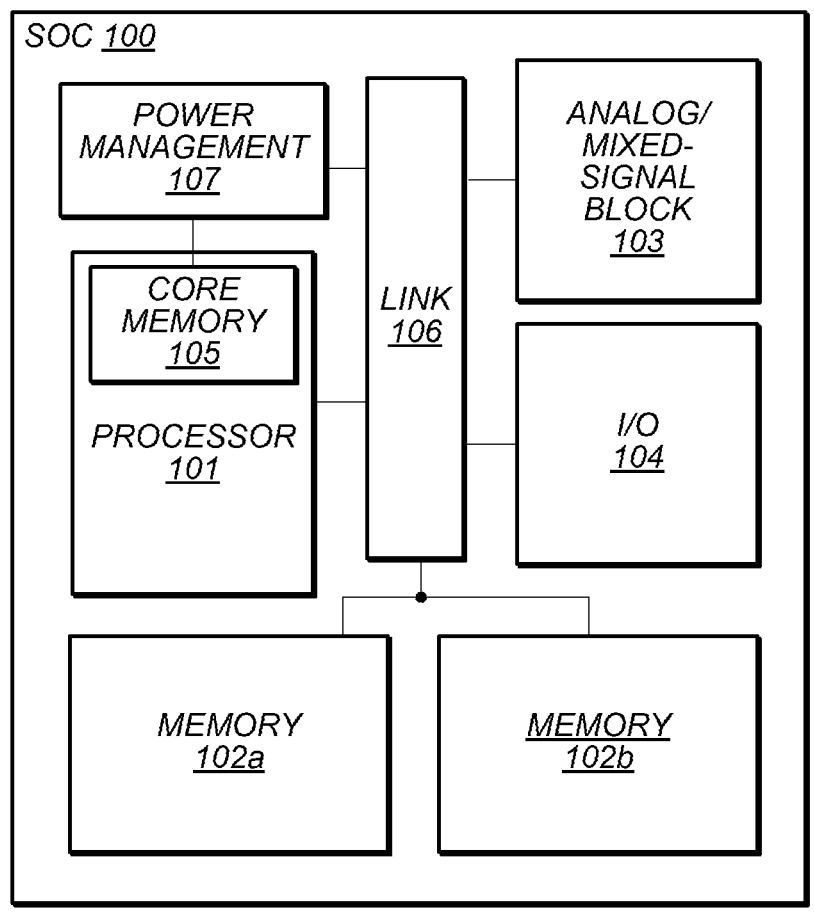
FIG. 1 illustrates an embodiment of a system-on-a-chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor, which may integrate the function of a computing system onto a single integrated circuit. Combining various features and/or functional blocks onto a single integrated circuit may reduce the needed circuit board space as well as conserve power. For these reasons, SoC devices are a popular choice for portable applications where space and power for components is limited.

To reduce power consumption in some SoC designs, processors included in the SoC may enter an inactive, idle state upon completing certain computing tasks. Within this disclosure, inactive state and idle state are used interchangeably to refer to a state of a functional block in which little to no activity is occurring within the functional block. An idle state may be when the processor is not executing instructions. An idle state may additionally include a lack of activity in one or more co-processors such as, for example, an arithmetic logic unit.

Peripheral circuitry may be placed into inactive or reduced activity states to further conserve system power. In some designs, clock gating and power gating may be used to place functional blocks, such as e.g., processors, into idle states. However, putting peripheral circuits into inactive states may cause delays upon returning back to full active operation as some peripherals may require more time to recover from an idle state than the processors require. These delays may negatively impact performance of the device and cause unnecessary power consumption and EMI emissions as processors may wait, running full power, while unable to access peripheral circuits with longer recovery times. Therefore, it may be undesirable to put peripheral circuits into a reduced activity or inactive state if the processors will only be in their idle state for a short time.

In some embodiments, briefly placing peripheral circuits into inactive states may be avoided by delaying such action for a period of time after the processors enter inactive states. A system may prevent the peripherals from entering idle states if the processors transition back to full active states before the end of the time period. The time period may be preset in the system or it may be set dynamically by an application running on the processors.

Various embodiments of a power management unit are described in this disclosure. The embodiments illustrated in the drawings and described below may provide techniques for managing the operational states of peripheral circuits within a computing system.

System-on-a-Chip Overview

A block diagram of an SoC is illustrated in FIG. 1. In the illustrated embodiment, the SoC 100 includes a processor 101 coupled to memory blocks 102a and 102b, an analog/mixed-signal block 103, an I/O block 104, and a power management unit 107, through a communications link 106. Processor 101 is also coupled directly to a core memory 105. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores. In some embodiments, processor 101 may include one or more register files and memories.

In some embodiments, processor 101 may implement any suitable instruction set architecture (ISA), such as, e.g., PowerPC™, or x86 ISAs, or combination thereof. Processor 101 may include one or more bus transceiver units that allow processor 101 to communicate to other functional blocks within SoC 100 such as, memory blocks 102a and 102b, for example.

Memory 102a and memory 102b may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), or a Magnetoresistive Random Access Memory (MRAM), for example. Some embodiments may include single memory, such as memory 102a and other embodiments may include more than two memory blocks (not shown). Memory 102a and memory 102b may be multiple instantiations of the same type of memory or may be a mix of different types of memory. In some embodiments, memory 102a and memory 102b may be configured to store program code or program instructions that may be executed by processor 101. Memory 102a and memory 102b may, in other embodiments, be configured to store data to be processed, such as graphics data, for example.

Analog/mixed-signal block 103 may include a variety of circuits including, for example, a crystal oscillator, a phase-locked loop (PLL) or delay-locked loop (DLL), an analog-to-digital converter (ADC), and a digital-to-analog converter (DAC) (all not shown). In some embodiments, analog/mixed-signal block 103 may also include, in some embodiments, radio frequency (RF) circuits that may be configured for operation with cellular telephone networks. Analog/mixed-signal block 103 may include one or more voltage regulators to supply one or more voltages to various functional blocks and circuits within those blocks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 104 may be configured to implement a version of Universal Serial Bus (USB) protocol, IEEE 1394 (Firewire®) protocol, or, and may allow for program code and/or program instructions to be transferred from a peripheral storage device for execution by processor 101. In one embodiment, I/O block 104 may be configured to perform the data processing necessary to implement an Ethernet (IEEE 802.3) networking standard.

Core memory 105 may be configured to store frequently used instructions and data for the processor 101. Core memory 105 may be comprised of SRAM, DRAM, or any other suitable type of memory. In some embodiments, core memory 105 may be a part of a processor core complex (i.e., part of a cluster of processors) as part of processor 101 or it may be a separate functional block from processor 101.

Communications link 106 may be configured as one or more buses to couple processor 101 to the other functional blocks within the SoC 100 such as, e.g., memory 102a, and I/O block 104. In some embodiments, communications link 106 may include interfaces coupled to one or more of the functional blocks that allow a particular functional block to communicate through the link. In some embodiments, communications link 106 may allow movement of data and transactions between functional blocks without intervention from processor 101. For example, data received through the I/O block 104 may be stored directly to memory 102a.

Power management unit 107 may be configured to manage power delivery to some or all of the functional blocks included in SoC 100. In some embodiments, the power management unit 107 may be configured to manage the clock distribution to some or all of the functional blocks included in SoC 100. The state of processor 101 may be, in some embodiments, monitored by the power management unit 107.

Power management unit 107 may be configured to disable communications link 106, such that signals cannot be sent or received through communications link 106 until such time that communications link 106 is re-enabled. In some embodiments, power management unit 107 may be configured to disable core memory 105, such that reading and writing memory locations is prohibited until such time that core memory 105 is re-enabled. In some embodiments, power management unit 107 may be configured to disable communications link 106 and core memory 105 at a given time after detecting the processor 101 has entered an idle state. Power management unit 107 may be configured, in some embodiments, to disable the communications link 106 at one time after detecting the processor 101 has entered an inactive state and to disable the core memory 105 at another time after detecting the processor 101 has entered an inactive state. Further details of power management unit 107, including details of disabling communications link 106 and core memory 105, will be discussed later in the disclosure.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltages.

Figure 2:
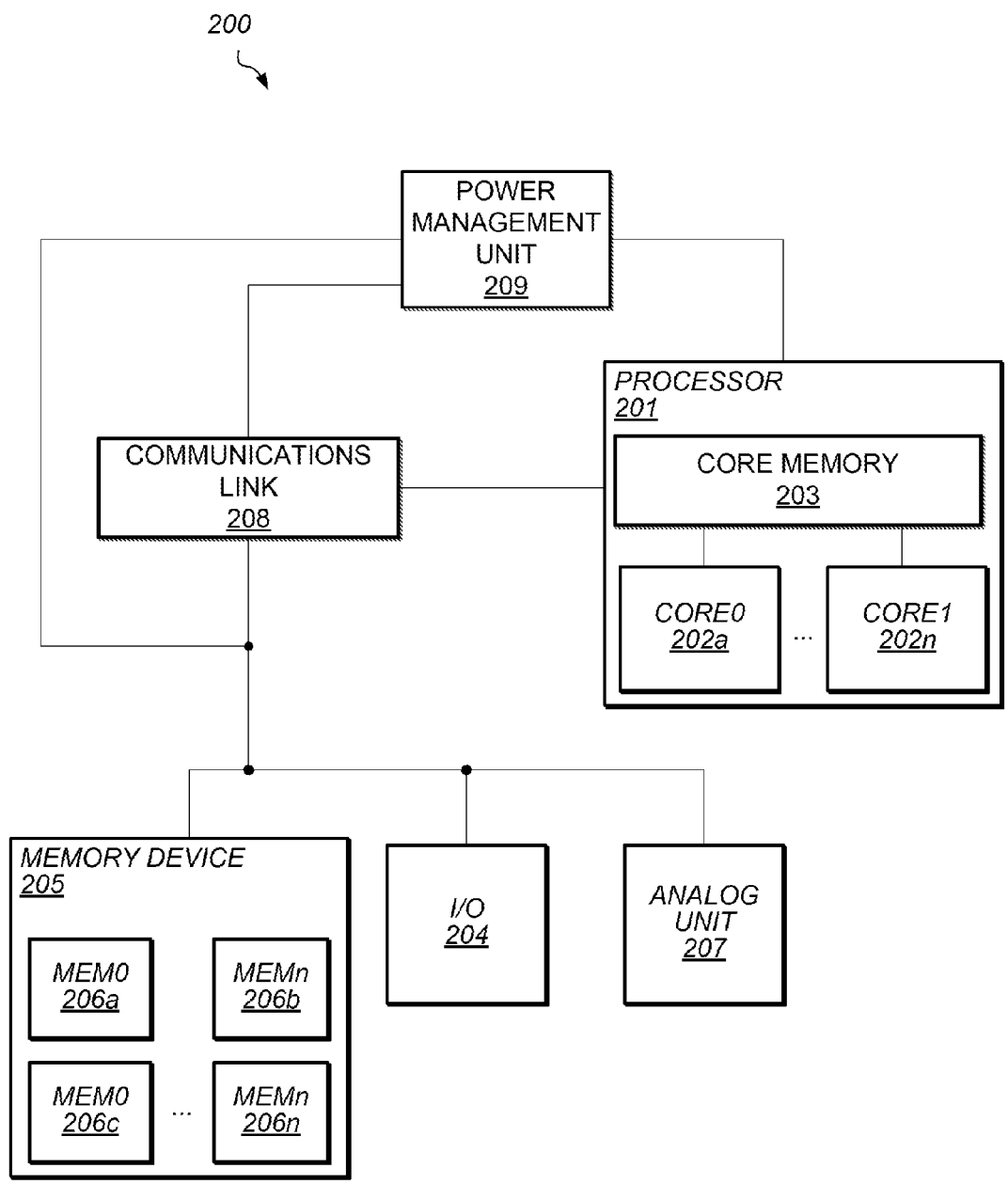
FIG. 2 illustrates an embodiment of a system.

An alternative embodiment of a system is illustrated in FIG. 2. System 200 may have a processor 201, where in the processor may be comprised of one or more processing cores 202a-202n. Processor 201 may also include a core memory 203 that may be shared between some or all of the cores 202a-202n. In some embodiments, each core 202a-202n may have a dedicated core memory (not shown). In some embodiments, the cores 202a-202n may all be of the same CPU core type. In other embodiments, the cores 202a-202n may be a combination of two or more CPU core types. In some embodiments, system 200 may have more than one processor (not shown).

System 200 may further comprise an I/O block 204 and an Analog unit 207. I/O block 204 may function similarly to SoC 100 I/O block 104. Analog unit 207 may function similarly to analog/mixed-signal block 103 of SoC 100 as illustrated in FIG. 1.

System 200 may have a memory device 205. Memory device 205 may be comprised of one or more memory die 206a-206n. In some embodiments, memory device 205 may include one or more memory controllers. Memory device 205 may be comprised of any suitable type of memory as discussed in the description of SoC 100 memory blocks 102a and 102b.

System 200 may have a communications link 208 that connects the processor 201 to other functional blocks. Communications link 208 may have some or all of the functions as described for the SoC 100 communication link 106. In some embodiments, communications link 208 may synchronize communication among various functional blocks operating in one or more clock domains.

System 200 may have a power management unit 209. Power management unit 209 may have similar functions as SoC 100 power management unit 107. In some embodiments, power management unit 209 may be instantiated as a microcontroller or an FPGA, programmed to perform the power management unit functions. In other embodiments, power management unit 209 may be instantiated as an ASIC, designed to perform the power management unit functions. Power management unit 209 may further be instantiated from discrete components, collectively engineered to perform the power management unit functions.

It is noted that the system illustrated in FIG. 2 is merely an example. In other embodiments, the various functional blocks illustrated in system 200 may be on different die or various combinations of functional blocks may be on the same die.

Figure 5:
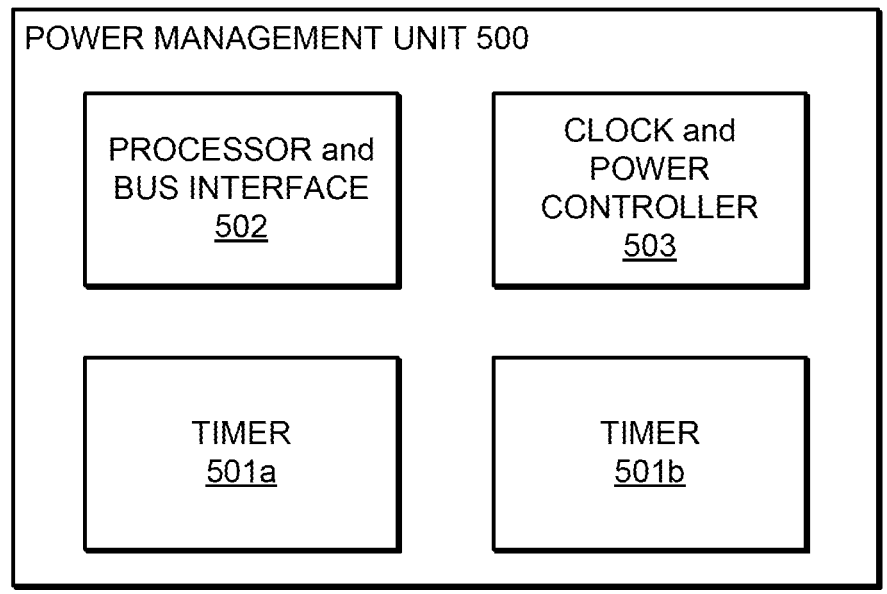
FIG. 5 illustrates an embodiment of a functional block for managing the control of clocks and power to a system.

FIG. 5 illustrates one embodiment of a power management unit 500. Power management unit 500 may be an embodiment of power management unit 107 as found in FIG. 1 or power management unit 209 as found in FIG. 2. Power management unit 500 may include one or more timers. In the example of FIG. 5, two timers are shown, timer 501a and timer 501b. The operation of the timers will be described in more detail below.

Power management unit 500 may include a processor and bus interface block 502. Processor and bus interface block 502 may be configured to track the state of the processor 101 in order to detect if processor 101 has entered an idle state. In some embodiments, to communicate an idle state, processor 101 may write one or more bits in a memory location that is accessible and periodically read by processor and bus interface block 502. In other embodiments, processor 101 may send one or more signals to the processor and bus interface block 502, for example, through the communications link 106. In other embodiments, the one or more signals may be sent through a dedicated interface between the processor 101 and processor and bus interface block 502.

In some embodiments, processor and bus interface block 502 may be configured to detect activity on one or more busses in communications link 106. Processor and bus interface block 502 may be configured to reset timers 501a and 501b to their starting value if they detect activity in communications link 106. In other embodiments, processor and bus interface block 502 may be configured to reset timers 501a and 501b to starting values and abort the countdown if they detect activity in communications link 106.

To detect activity in communications link 106, processor and bus interface 502 may monitor the bus to detect transitions on any of the individual bus lines. In other embodiments, processor and bus interface 502 may communicate with a bus controller circuit that may keep track of active bus transactions. In other embodiments, processor and bus interface 502 may monitor control signals from functional blocks that are configured to request bus transactions.

Power management unit 500 may include a clock and power controller 503. In response to a signal from timer 501a, clock and power controller 503 may be configured to disable power to functional blocks, such as, for example, communications link 106. In some embodiments, in response to a signal from timer 501b, clock and power controller 503 may be configured to disengage clock signals to functional blocks, such as, for example, core memory 105. Further details on disengaging clocks and disabling power will be discussed later in the disclosure.

Figure 6:
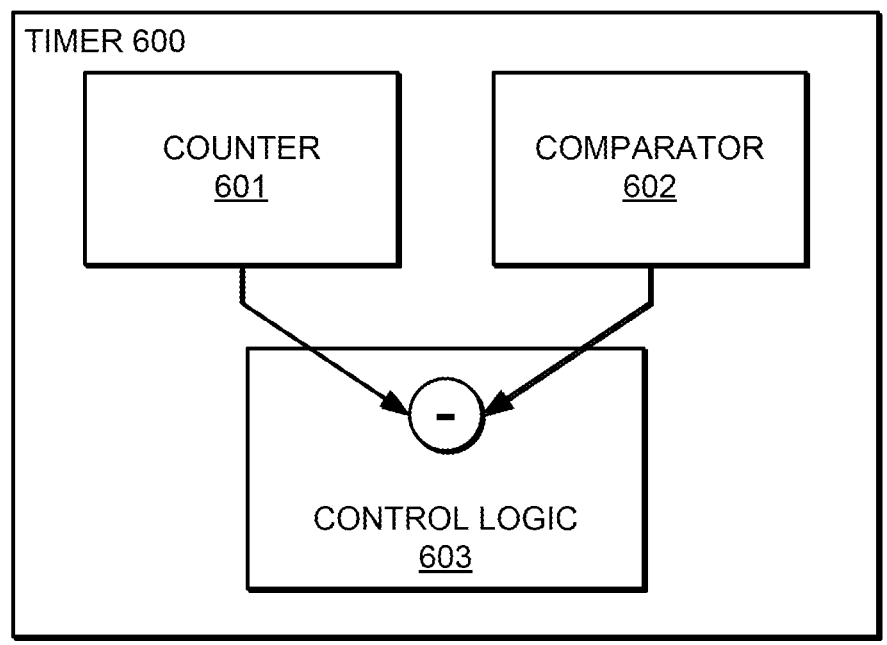
FIG. 6 illustrates an embodiment of a timer circuit.

FIG. 6 illustrates an embodiment of a timer 600. Timer 600 may be an embodiment of timers 501a and 501b used in power management unit 500 from FIG. 5 to measure time delays. Timer 600 may include a counter 601, a comparator 602, and control logic 603. A clock signal available in SoC 100 may be coupled to timer 600. The clock signal may run continuously while the SoC 100 is active or the clock signal may be gated on and off by a functional block, such as, for example, processor 101.

Counter 601 may include a register that stores a current timer value or count. Counter 601 may be configured to increment in response to the clock signal. In some embodiments, counter 601 may be configured to increment until reaching a specified maximum value. In other embodiments, the timer may decrement from a given starting value until reaching a value of zero. The given starting value and the specified maximum value may be fixed by the design of timer 600 or may be set by an application running on processor 101, such that, for example, different applications may set different values based on the application's requirements.

Comparator 602 may be a register coupled to counter 601. The value set in the comparator may be compared to the value in counter 601. The comparison may be made every clock cycle. Timer 600 may include a single comparator 602 as shown in FIG. 6. In some embodiments, timer 600 may include more than one comparator (not shown) such that timer 600 may be capable of measuring more than one delay.

Control logic 603 may be configured to detect a match between the value in counter 601 and the value in comparator 602 to determine the end of a delay. To detect if the comparator value and the counter value match, control logic may subtract one value from the other, a match occurring if the result is zero. In other embodiments, to detect a match between the comparator value and the counter value, the two values may undergo a bitwise exclusive-OR operation. If a timer is used where the counter 601 is decremented, the delay may end if the counter 601 value is zero.

In response to the end of a delay, control logic 603 may assert a signal to the clock and power controller 503. In some embodiments, the counter value may reset to its initial value and begin measuring another delay. In embodiments which include more than one comparator, counter 601 may continue counting until another comparator value is matched. In other embodiments, the timer may stop incrementing or decrementing the counter until a signal is received to start again.

FIG. 6 is merely one example of an embodiment of a timer. It should be noted that many varieties of timer circuits are known that may perform the function required for the power management unit 500. For example, a timer may be implemented as a state machine, configured to measure one or more delays.

Power Down Management Methods

Figure 3:
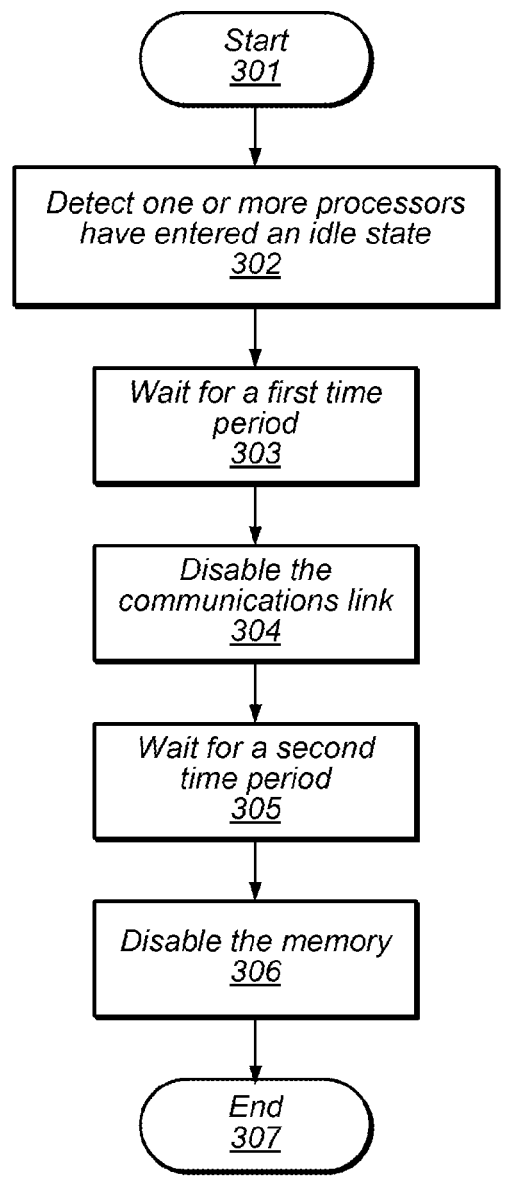
FIG. 3 illustrates a flowchart of an embodiment of a method for operating a power management unit.

FIG. 3 illustrates a method for managing a power down of a communications link and a memory by a power management unit such as, e.g., power management unit 107. Referring collectively to SoC 100 as illustrated in FIG. 1 and the flowchart depicted in FIG. 3, the method may begin in block 301. Processor 101 may enter an idle state (block 302). Power management unit 107 may be configured to detect processor 101 entering an idle state. In some embodiments, the detection may be implemented using one or more bits in a memory location that is accessible by power management unit 107. In other embodiments, processor 101 may send one or more signals to the power management unit, for example, through the communications link 106. In other embodiments, the one or more signals may be sent through a dedicated interface between the processor 101 and power management unit 107.

In response to the processor 101 entering an idle state, a time period may begin to be counted (block 303) by power management unit 107. In some embodiments, the time period may be set, dynamically, by an application running on processor 101. In some embodiments, the voltage on the power supply to core memory 105 may be reduced to the minimum required to retain the stored data in response to detecting processor 101 entering an idle state (block 302).

In response to the time period elapsing, communications link 106 may be disabled (block 304). In some embodiments, to disable communications link 106 (block 304), a clock source to one or more interfaces associated with communications link 106 may be disengaged. In some embodiments, to disable communications link 106 (block 304), a power source to one or more interfaces associated with communications link 106 may be disconnected. In other embodiments, logic may be contained within communications link 106, in which case, a power source may be disconnected from at least some of the logic to disable communications link 106. Alternatively, in such embodiments, a clock source may be disabled to at least some of the logic to disable communications link 106.

Another time period may be counted (block 305) in response to the previous time period elapsing. Power management unit 107 may initialize and begin a count for another period of time. The time period may be set by an application running on the processor 101. In other embodiments, the second time period may begin to be counted in response to processor 101 entering an idle state, thereby counting in parallel with the previous time period.

In response to the second time period elapsing, core memory 105 may be disabled (block 306). In some embodiments, to disable core memory (block 306), the voltage of the power supply to the core memory 105 may be reduced to the minimum required to retain the stored data, also referred to as a data retention state. In a data retention state, the memory retains the stored data, but the memory cannot be read or written. In some embodiments, to disable core memory (block 306), the power source to the core memory 105 may be disconnected. Communications link 106 may, in some embodiments, be enabled to transfer at least some of the data from core memory 105 to another memory, such as, e.g., memory 102*a*, before power is disconnected from core memory 105. Communications link 106 may be disabled again after core memory 105 is disabled. The method then concludes (block 307).

To disable the clock source to a given interface in communications link 106, the clock signal may be gated by a transmission gate before it reaches the interface. In some embodiments, a power supply to the clock source may be deactivated or disconnected, thereby causing the clock signal to cease. To deactivate a power source, a power switch between the power source and a functional block, such as, e.g., the core memory 105 or a clock source, may be opened. In some embodiments, to deactivate a power source may include turning a voltage regulator off. To reduce voltage on a power supply, the regulation point of a voltage regulator may be set lower. In some embodiments, to reduce voltage on a power supply may include switching to a different voltage regulator with a lower regulation point. In some embodiments, to reduce voltage on a power supply may include putting a voltage regulator into a looser regulation mode such that the voltage regulator uses less power.

As discussed above, the two time periods presented may be counted in parallel. In such cases, the second time period (block 305) may be shorter than the first time period (block 303), resulting in the core memory 105 being disabled before the communications link 106. Other embodiments may disable both the communications link and core memory after the same time period. Still other embodiments may disable different functional blocks, such as, e.g., the analog and mixed signal block 103.

It is noted that the method illustrated in the flowchart depicted in FIG. 3 is merely an example. In other embodiments, different operations and different orders of operations are possible. In some embodiments, additional or alternate functional blocks may be disabled.

Figure 4:
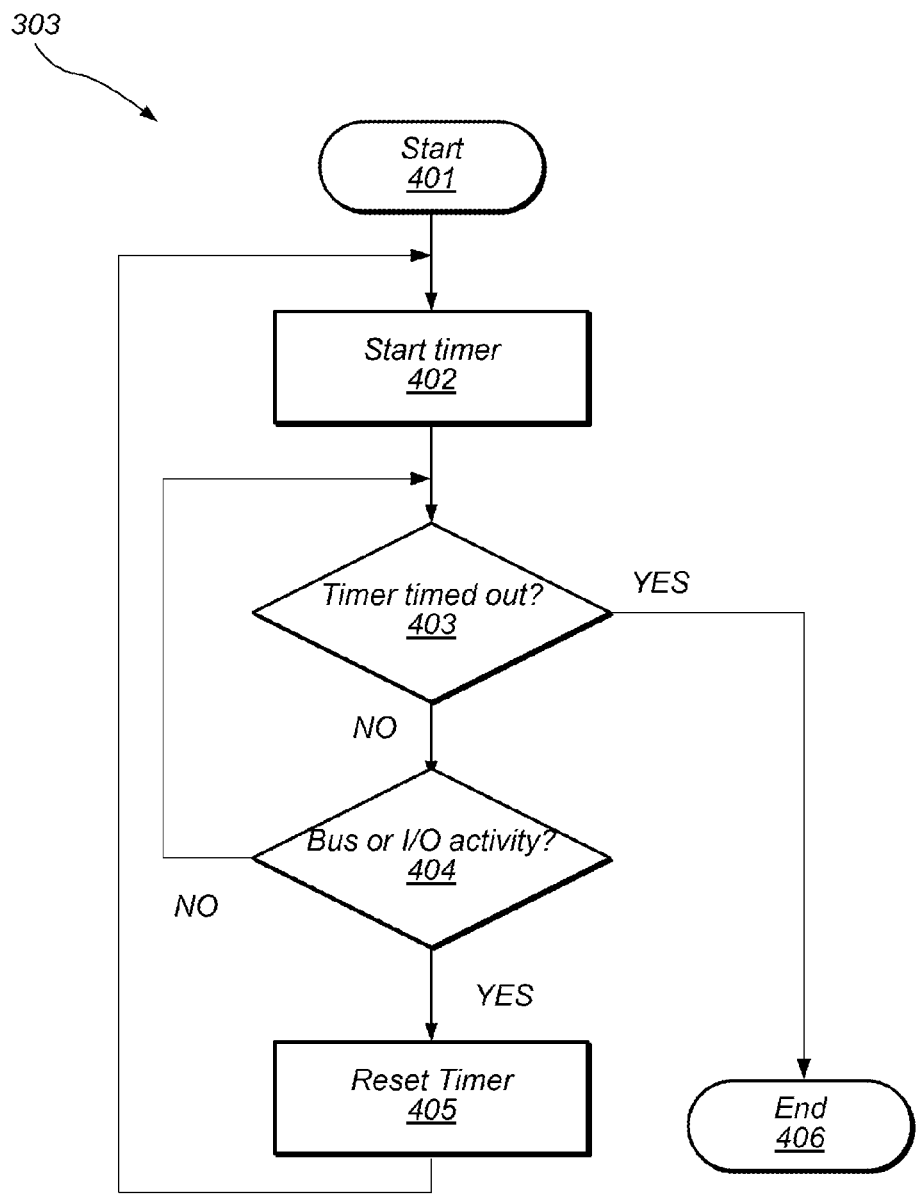
FIG. 4 illustrates a flowchart of an embodiment of a method for operating a timing circuit.

FIG. 4 illustrates a method performed when waiting for a time period (block 303 or block 305). Referring collectively to SoC 100 as illustrated in FIG. 1, timer 600 as illustrated in FIG. 6, and the flowchart depicted in FIG. 4, the method begins in block 401. In response to the processor 101 entering an idle state (block 302), timer 600 may begin incrementing based on an available clock signal within SoC 100 (block 402). Comparator 602 in the timer may have been pre-programmed with a value, for example, by an application running on the processor 101.

Timer 600 may monitor the value in counter 601 to know when the time period has elapsed (block 403). If the time period has not elapsed, the method may depend on activity on communications link (block 404). If the time period has elapsed, the method may end (block 406). Monitoring may be implemented by comparing the value in counter 601 to the value in comparator 602, such that the comparator value is compared to the counter value every time counter 601 is incremented. In response to the counter 601 value matching the comparator 602 value, a signal may transition to indicate the end of the time period.

In the example embodiment, while counter 601 is incrementing and before it reaches the value in comparator 602, the communications link 106 may be monitored for activity (block 404). If no activity is detected, the counter may continue to increment. If activity is observed, the method moves to block 405 to reset the timer. Communication link 106 activity may result from one of the functional blocks, such as, e.g., the I/O block 104 or the analog/mixed signal block 103, receiving stimulus and requiring system resources to process the stimulus. However, as long as no activity is detected on the communications link 106, timer 600 is allowed to continue incrementing.

If activity is detected on the communications link 106, then timer 600 may be reset (block 405) and the time period begins anew. In some embodiments, the reset of the timer may be delayed and the activity continued to be monitored for an additional time period to determine if the activity continues or ceases before resetting the timer. In such a case where the activity ceases before the timer reaches its terminal value, the timer may not be reset and instead be allowed to continue counting. In some embodiments, instead of resetting the timer and restarting the time period, the time period countdown may be aborted and the method ends (not shown).

Resetting timer 600 may include initializing counter 601 to a start value, such as, for example, zero. In some embodiments, for example in which the counter 601 decrements, the counter 601 may be initialized to a non-zero start value. Resetting of timer 600 may also include clearing an asserted signal that signified the end a match between the counter 601 and comparator 602. The reset of timer 600 may be synchronized to occur in a given clock period after the activity was detected. In other embodiments, the reset of timer 600 may be asynchronous to the clock signal and counter 601 initialized without reference to the clock signal. In some embodiments, timer 600 may restart counting in response at the next received clock cycle. In other embodiments, timer 600 may stop counting until instructed to re-start by control logic in the power management unit 107.

While the method depicted in FIG. 4 is depicted as being performed sequentially, in some embodiments, one or more operations may be performed in parallel. In other embodiments, different operations and different orders of operations are possible and contemplated. If the method is followed, a reduction in power consumption may be realized in some embodiments. In other embodiments, a reduction in EMI emissions may be achieved.

Numerous variations and modifications will become apparent to those skilled in the art once the above disclosure is fully appreciated. It is intended that the following claims be interpreted to embrace all such variations and modifications.

What is claimed is:

1. A system, comprising:
   a first memory;
   a second memory, different from the first memory;
   one or more processors coupled to the first memory;
   a communication link coupled to the one or more processors and to the second memory; and
   a power management unit configured to:
      detect an idle state of at least one processor of the one or more processors;
      disable at least a portion of the communication link in response to a determination that a first time period has elapsed since the idle state was detected;
      transfer at least a portion of data stored in the first memory to the second memory in response to a determination that a second time period has elapsed since the idle state was detected, wherein the second time period is greater than the first time period;
      wherein to transfer the at least a portion of the data, the power management unit is further configured to:
         re-enable the at least a portion of the communication link disabled after the first time period elapsed;
         transfer the at least a portion of the data via the at least a portion of the communication link; and
         disable the at least a portion of the communication link in response to a determination that the transfer of the at least a portion of the data is complete; and
      disable power to the first memory in response to the determination that the transfer of the at least a portion of the data is complete.

2. The system of claim 1, wherein to disable the at least a portion of the communication link, the power management unit is further configured to compare a first output value of a first timer circuit to a first pre-determined value.

3. The system of claim 2, wherein to transfer the at least a portion of the data stored in the first memory, the power management unit is further configured to compare a second output value of a second timer circuit to a second pre-determined value.

4. The system of claim 1, wherein the at least one processor of the one or more processors is configured to send, via the communication link, one or more signals to a control circuit to indicate that the at least one processor is in the idle state.

5. The system of claim 1, wherein to disable power to the first memory, the power management unit is further configured to place the first memory into a data retention state.

6. The system of claim 1, wherein the power management unit is further configured to receive a first value for a length of the first time period and a second value for a length of the second time period from an application running on the one or more processors.

7. The system of claim 3, wherein the power management unit is further configured to:
   detect activity within the system; and
   in response to a detection of the activity, reset the first timer circuit and the second timer circuit to a first initial value and a second initial value, respectively.

8. A method for managing power in a computing system, comprising:
   detecting that at least one processor of one or more processors has entered an inactive state;
   disabling at least a portion of a communication link in response to determining that a first time period has elapsed since detecting the inactive state of the at least one processor;
   transferring at least a portion of data stored in a first memory to a second memory in response to determining that a second time period has elapsed since detecting the inactive state of the at least one processor, wherein the second time period is greater than the first time period;
   wherein transferring the at least a portion of the data comprises:
      re-enabling the at least a portion of the communication link disabled after the first time period elapsed;
      transferring the at least a portion of the data via the at least a portion of the communication link; and
      disabling the at least a portion of the communication link in response to determining that transferring the at least a portion of the data has completed; and
   disabling power to the second memory in response to determining that transferring the at least a portion of the data has completed.

9. The method of claim 8, wherein disabling power to the first memory further comprises activating a data retention mode in the first memory.

10. The method of claim 8, further comprising sending, by the at least one processor of the one or more processors, one or more signals to a control circuit via the communication link to indicate that the at least one processor is in the inactive state.

11. The method of claim 8, wherein disabling the at least a portion of the communication link further comprises disabling one or more clocks to the at least a portion of the communication link.

12. The method of claim 8, wherein disabling the at least a portion of the communication link further comprises disabling power to the at least a portion of the communication link.

13. The method of claim 8, wherein a first value for a length of the first time period and a second value for a length of the second time period are set by an application running on the one or more processors.

14. The method of claim 8, further comprising:
   monitoring for activity within the system and in response to detecting the activity:
      waiting for another first time period to elapse before disabling the communication link; and
      waiting for another second time period to elapse before disabling the first memory.

15. A device, comprising:
   a first memory;
   one or more processors coupled to the first memory;
   a communication link coupled to the one or more processors; and
   a control circuit configured to:
      receive a first value and a second value from an application running on the one or more processors, wherein the second value is greater than the first value;
      detect an inactive state of at least one processor of the one or more processors;
      disable at least a portion of the communication link in response to a determination that a first time period has elapsed since the inactive state was detected, wherein the first time period is dependent upon the first received value;
      transfer at least a portion of data stored in the first memory to a second memory in response to a determination that a second time period has elapsed since the inactive state was detected, wherein the second time period is dependent upon the second received value;
   wherein to transfer the at least a portion of the data, the control circuit is further configured to:
      re-enable the at least a portion of the communication link disabled after the first time period elapsed;
      transfer the at least a portion of the data via the at least a portion of the communication link; and
      disable the at least a portion of the communication link in response to a determination that the transfer of the at least a portion of the data is complete; and
   disable power to the first memory in response to the determination that the transfer of the at least a portion of the data is complete.

16. The device of claim 15, wherein to disable the at least a portion of the communication link, the control circuit is further configured to compare a first output value of a first timer circuit to the received first value prior to disabling the at least a portion of the communication link.

17. The device of claim 16, wherein to transfer the at least a portion of the data stored in the first memory, the control circuit is further configured to compare a second output value of a second timer circuit to the received second value prior to the transfer.

18. The device of claim 15, wherein to disable power to the first memory, the control is further configured to place the first memory into a data retention state.

19. The device of claim 15, wherein the at least one processor of the one or more processors is further configured to send one or more signals to the control circuit via the communication link to indicate that the at least one processor of the one or more processors is in the inactive state.

20. The device of claim 17, wherein the control circuit is further configured to:
   detect activity within the device; and
   in response to a detection of the activity, reset the first timer circuit and the second timer circuit to a first initial value and a second initial value, respectively.

* * * * *